(12) United States Patent
Shukla

(10) Patent No.: US 6,456,997 B1
(45) Date of Patent: Sep. 24, 2002

(54) SYSTEM AND METHOD FOR DYNAMICALLY GENERATING AN INVISIBLE HIERARCHY IN A PLANNING SYSTEM

(75) Inventor: Manu Shukla, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,131

(22) Filed: Apr. 12, 2000

(51) Int. Cl.[7] ............................................. G06F 17/30
(52) U.S. Cl. ............................ 707/1; 707/100; 707/104
(58) Field of Search ............................ 707/1, 100, 104, 707/3, 6, 7, 10, 200; 706/46, 13; 705/8; 345/440, 848; 716/8

(56) References Cited

U.S. PATENT DOCUMENTS

| | | | | |
|---|---|---|---|---|
| 5,553,212 A | * | 9/1996 | Etoh et al. | 345/440 |
| 5,731,985 A | | 3/1998 | Gupta et al. | 716/8 |
| 5,808,609 A | | 9/1998 | Guha | 345/848 |
| 5,905,985 A | | 5/1999 | Malloy et al. | 707/100 |
| 5,912,674 A | * | 6/1999 | Magarshak | 345/440 |
| 5,926,818 A | | 7/1999 | Malloy | 707/100 |
| 5,943,668 A | | 8/1999 | Malloy et al. | 707/3 |
| 6,317,732 B1 | * | 11/2001 | Inoue et al. | 706/46 |

FOREIGN PATENT DOCUMENTS

JP        9150311         6/1997 ........... G06F/17/60

OTHER PUBLICATIONS

IBM Technical Disclosure Bulletin, vol. 38, No. 7, Jul. 1995.
Simultaneous Optimization and Evaluation of Multiple Dimensional Queries, Zhao et al., Jun. 1998.

* cited by examiner

*Primary Examiner*—Sanjiv Shah
(74) *Attorney, Agent, or Firm*—Michael F. Hoffman

(57) ABSTRACT

A planning system and method for dynamically generating an invisible hierarchy during a planning session in an OLAP type tool. The planning system comprises: (1) a loading mechanism for loading a plan segment, wherein the plan segment is a portion of a plan cube and comprises data, rules, and a defined hierarchy within a dimension; (2) a checking mechanism for determining whether any of the rules associated with the plan segment reference data outside of the plan segment; and (3) a mechanism for creating an invisible hierarchy, wherein the invisible hierarchy comprises the defined hierarchy and at least one ancestor of a top member of the defined hierarchy.

16 Claims, 6 Drawing Sheets

SYSTEM AND METHOD FOR DYNAMICALLY GENERATING AN INVISIBLE HIERARCHY IN A PLANNING SYSTEM

BACKGROUND OF THE INVENTION

1. Technical Field

The present invention relates to computerized planning systems, and more specifically, to a computerized planning system and method that dynamically generates an invisible hierarchy during a planning session.

2. Related Art

Merchandise planning systems have become an important tool for successful business planning. Proper merchandise planning allows a business to purchase the right levels of merchandise, in the right assortments, for the right stores. When done correctly, stores have balanced inventories and customers find the products they want. When done incorrectly, stores are faced with clearance markdowns, unhappy customers, and unbalanced inventories. Accordingly, accurate merchandise planning can be the difference between profitability and unprofitability.

Specialized systems that handle planning data are now available to facilitate merchandise planning. Merchandise planning systems allow planners to create, monitor, evaluate and adjust merchandising plans. A typical system includes one or more clients in contact with a server engine, which in turn has access to an extensive database of planning data, referred to as a plan. Planning data is typically based on a retail cube that consists of product, location and time dimensions, and includes variables defined at each intersection that are calculated according to predefined rules. Dimensions are generally defined in a hierarchical fashion utilizing parent-child relationships. For example, in a product dimension, hierarchical planning levels may include a company level, a department level, and an SKU (stock keeping unit) level. Within each level, there exists one or more members. Thus, members in the department level are considered children of the company level member(s), and parents of the SKU level members. Such a system is described in U.S. Pat. No. 5,943,668, "Relational Emulation Of A Multidimensional Database," issued on Aug. 24, 1999 to Malloy et al., and assigned to International Business Machines Corporation, which is hereby incorporated by reference.

Given the extensive amount of data in a typical plan, a planner will often be limited to downloading and working with only a portion or segment of the plan. For instance, if a planner is responsible for planning for a department within a company, the planner will download only the segment of the plan for that department. Thus, if the planner is responsible for planning for children's clothing, the planner will generally not need to download data relating to men's sportswear. A downloaded segment generally comprises data, rules for calculating variables, and one or more defined hierarchies within a dimension.

Once the data is downloaded, planning is done with a spreadsheet-like interface that allows a planner to display and analyze data. During planning sessions, planners can study and manipulate planning data to, for example, plan for business needs, create "what-if" scenarios, and analyze performance. Accordingly, a planner can adjust data values for a given variable, e.g., projected sales for a particular SKU for a given month, and examine the consequences, e.g., an inventory shortage or surplus the following month.

One of the problems that may arise during a planning session, however, is that the rules used to calculate some of the downloaded data may depend upon, or reference, data that was not downloaded. For instance, a planner may want to examine the percentage of inventory his or her department will account for relative to the entire company based on projections the planner is making for the department. In order to calculate such results, data from a parent or ancestor member, i.e., the entire company, would be required. Because such data would not typically be part of the planner's downloaded data, such references would be deemed invalid and the planner would not be able to obtain the desired information. Accordingly, planners are essentially limited to planning with only values that exist within their loaded segment.

SUMMARY OF THE INVENTION

The present invention addresses the above-mentioned problems by providing a planning system and method for dynamically generating an invisible hierarchy during a planning session. The invisible hierarchy includes data that exists outside of a plan segment that may be referenced by rules within the plan segment. The planning system may comprise a program product having computer readable code stored on a recordable media for creating an invisible hierarchy within a planning system, the program product comprising: (1) a loading mechanism for loading a plan segment, wherein the plan segment is a portion of a plan cube and comprises data, rules, and a defined hierarchy within a dimension; (2) a checking mechanism for determining whether any of the rules associated with the plan segment reference data outside of the plan segment; and (3) a mechanism for creating an invisible hierarchy, wherein the invisible hierarchy comprises the defined hierarchy and at least one ancestor of a top member of the defined hierarchy.

In a second aspect, the invention may comprise a planning system implemented in a client-server environment, comprising: (1) a processor; (2) memory for storing machine readable instructions that are executable by the processor, and for storing data; (3) a server system, wherein the server system includes: (a) a loading mechanism for loading a plan segment, wherein the plan segment is a portion of a plan cube and comprises data, rules, and a defined hierarchy within a dimension; (b) a checking mechanism for determining whether any of the rules associated with the plan segment reference data outside of the plan segment; and (c) a mechanism for creating an invisible hierarchy, wherein the invisible hierarchy comprises the defined hierarchy and at least one ancestor of a top member of the defined hierarchy; and (4) a client system, wherein the client system includes: (a) an interface system for displaying and manipulating data associated with the plan segment; and (b) a mechanism for displaying data associated with the invisible hierarchy.

In a third aspect of the invention, a method is provided for dynamically creating an invisible hierarchy in a planning tool during a planning session, comprising the steps of: (1) loading a segment of a planning cube, wherein the segment comprises data, rules, and a predefined hierarchy; (2) examining the rules to determine if data from outside the segment is referenced by the rules; (3) identifying ancestor members of a top member of the predefined hierarchy; (4) loading ancestor member details and ancestor data for the identified ancestor members; and (5) creating an invisible hierarchy comprised of the predefined hierarchy and the identified ancestor members.

BRIEF DESCRIPTION OF THE DRAWINGS

The preferred exemplary embodiment of the present invention will hereinafter be described in conjunction with the appended drawings, where like designations denote like elements, and.

Figure 1:
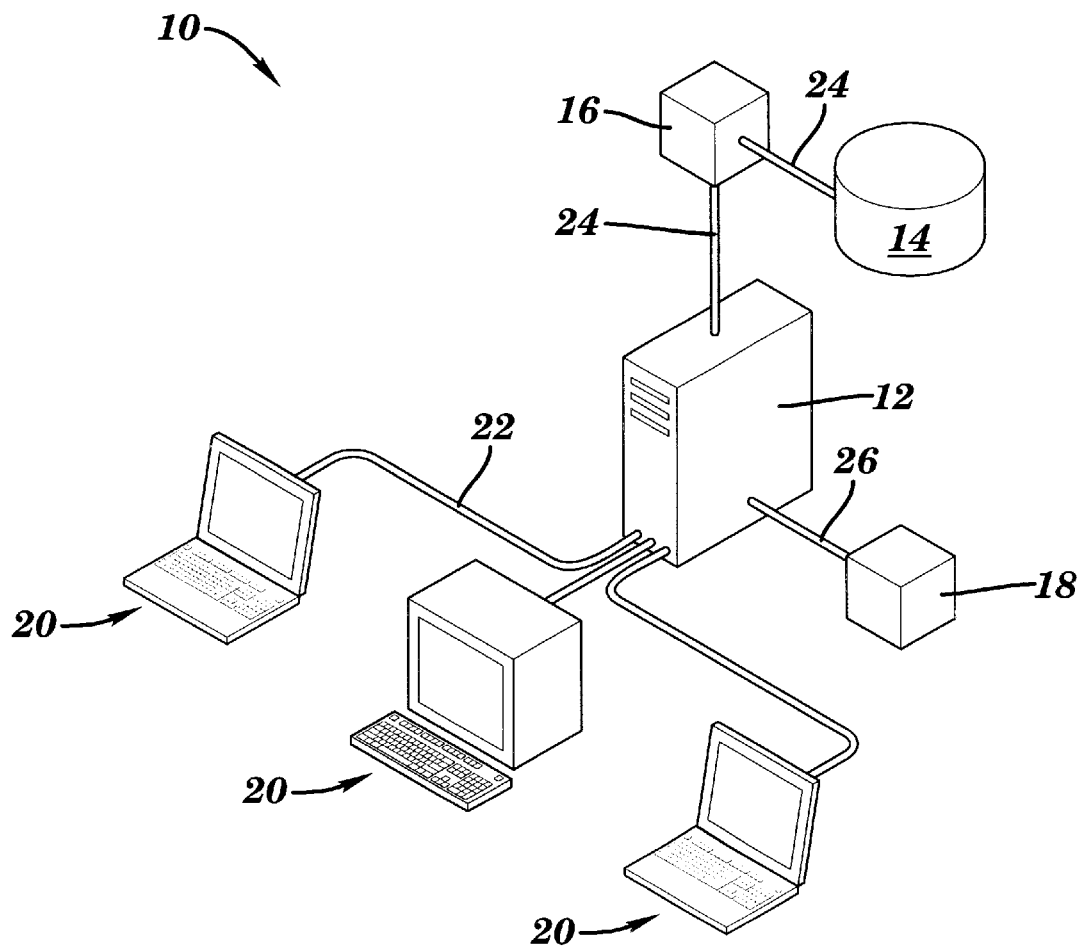
FIG. 1 depicts a planning system in accordance with a preferred embodiment of the invention.

It is noted that the figures of the invention are not necessarily drawn to scale. The drawings are merely schematic representations, not intended to portray specific parameters of the invention. Rather, the drawings are intended to depict only typical embodiments of the invention, and therefore should not be considered as limiting the scope of the invention. In the drawings, like numbering represents like elements between the drawings.

DETAILED DESCRIPTION OF THE DRAWINGS

1. Overview of the Planning System and Software

Referring now to the figures, FIG. 1 depicts a computerized planning system 10. Planning system 10 comprises a planning engine server 12, a relational database 14, a data access engine 16, a plurality of client terminals 20, a planning data cube 18, and a plurality of communication links 22, 24 and 26. It should be recognized that although the system 10 is shown as a plurality of components, each or all of these components can reside within a single or distributed computer system. Client terminals 20 provide the planner with an interface to access planning data and engage in a planning session. Planning data is stored in relational database 14, and is accessed by planning engine server 12 via data access engine 16 and communication link 24. Planning software, which is used to analyze and manipulate planning data, may reside on planning engine server 12 as well as client terminals 20. Planning data cube 18 (i.e., a plan segment) comprises a subset of planning data that is utilized in a present planning session. It should be understood that each of the communication links 22, 24 and 26 may be implemented in any known manner, such as via a coaxial cable, phone wires, optical cable, wireless transmission, etc. Accordingly, each of the components may or may not reside in the same physical location.

The planning system 10 is generally described herein in terms of a merchandise planning system. Accordingly, it is understood that one skilled in the art is familiar with planning software systems, such as MAKORO™ sold by IBM Corporation. However, it should also be recognized that this invention covers any type of online analytical processing (OLAP) system that utilizes dimensional modeling, including planning systems, inventory management, parts requirements, financial planning, etc. Thus, for the purposes of this invention, reference to a merchandise planning system refers to all such systems.

2. Overview of Dimensional Modeling

Figure 2:
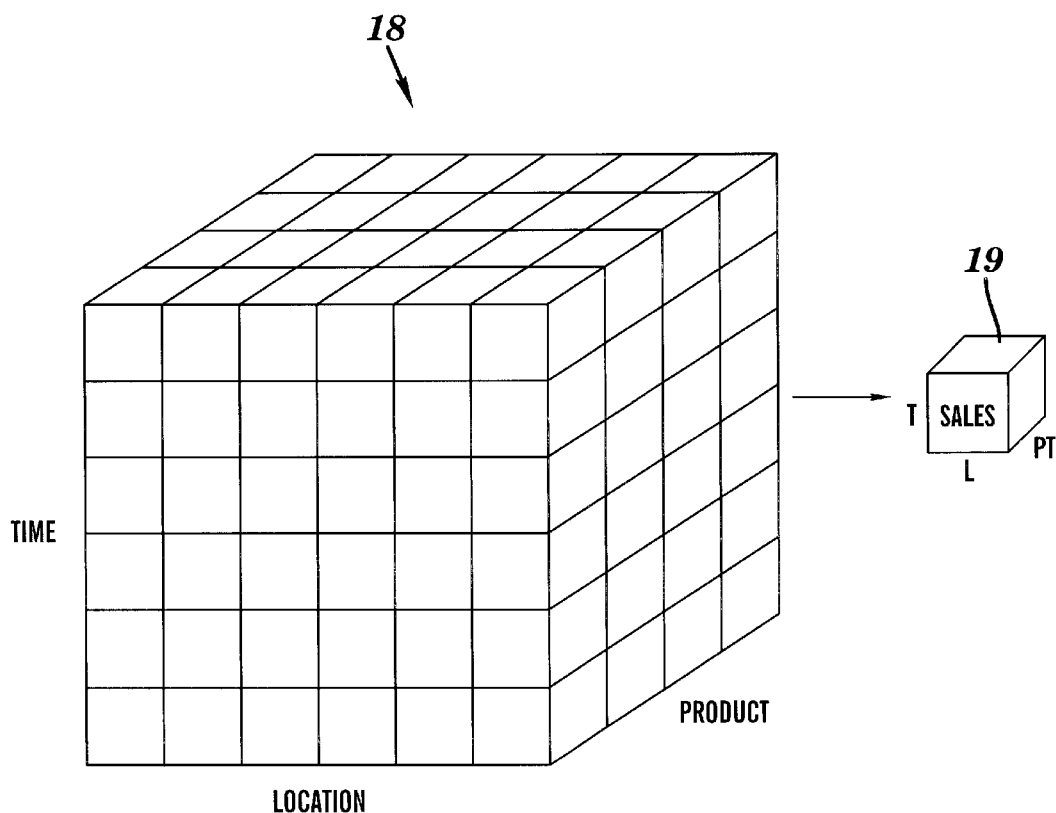
FIG. 2 depicts a multidimensional view of a business in accordance with a preferred embodiment of the invention.

Referring to FIG. 2, dimensional modeling provides a mechanism for visualizing data in a multidimensional cube 18. When data is presented as a multidimensional cube 18, planners can "slice" the cube along any of its dimensions and view data within that context. Business data is viewed within the context of such a cube 18. Cube 18 has axes labeled product, location, and time, which provide a dimensional view of a business. A point inside the cube is at the intersection of coordinates defined on the dimensional axes. Each intersection point contains measurements of the business. At each intersection of product, location, and time, the cube 18 maintains a value for a relevant business measurement, for example sales 19. While this embodiment describes data in three dimensions, it is understood that the scope of this invention is not limited as such and any number of dimensions with any designations could be utilized.

Dimensional modeling entails maintaining business information (e.g., sales) and dimensional structures (e.g., product, location, time) for viewing business information. Business information comprises numerical measurements of the business data. Dimensions are independent, business specific abstractions that provide a mechanism for partitioning and subsequently viewing business information. Such information resides in a hierarchical manner within a dimension. The hierarchical views allow a planner to view facts at an arbitrary, but predetermined granularity.

Members are "things" of a given "type," wherein each type is referred to as a "level." Members in a level share a common business semantic for the purposes of hierarchical decomposition of a dimension. In a product dimension, a business might have levels such as divisions (e.g., Ladies, Mens, etc.), classes (e.g., party dresses), styles, style-colors, and SKUs (Stock Keeping Units). Each of these levels has a number of members. Thus, a particular type of black boot, size 10 is a member (i.e., an SKU), and the "Ladies' division" is also a member. Members and levels are related together by parent child relationships, e.g., the company (parent) has several divisions (children), each division has several departments, each department has several classes, etc. Levels in a location dimension may include regions, districts and stores. Levels in a time dimension might be years, seasons, months, weeks, and days.

A dimension may contain multiple hierarchies, each of which provides a different business view of the underlying facts. The levels in a dimension logically provide an axis of a multidimensional cube, while the members in a level provide the coordinates of that axis. The hierarchical view within a dimension is maintained by parent-child relationships. A hierarchy, or hierarchical view, is a path through a series of parent-child relationships of levels that extend from a top level to a bottom level.

In general, OLAP systems enable a planner to easily and selectively extract and view data from different points-of-view. For example, a planner can request that data be analyzed to display a spreadsheet showing all of a company's beach ball products sold in Florida in the month of July, compare revenue figures with those for the same products in September, and then see a comparison of other product sales in Florida in the same time period. To facilitate this kind of analysis, OLAP data may be stored in a "multidimensional" database or cube. A multidimensional database considers each data attribute (such as product, geographic sales region, and time period) as a separate "dimension." OLAP software can locate the intersection of dimensions (all products sold in the Eastern region above a certain price during a certain time period) and display them. Attributes such as time periods can be broken down into sub-attributes. OLAP can be used for data mining or the discovery of previously undiscerned relationships between data items. Additional examples of OLAP products include Arbor Software's Essbase™ and Oracle's Express Server™.

3. Planning System

Figure 3:
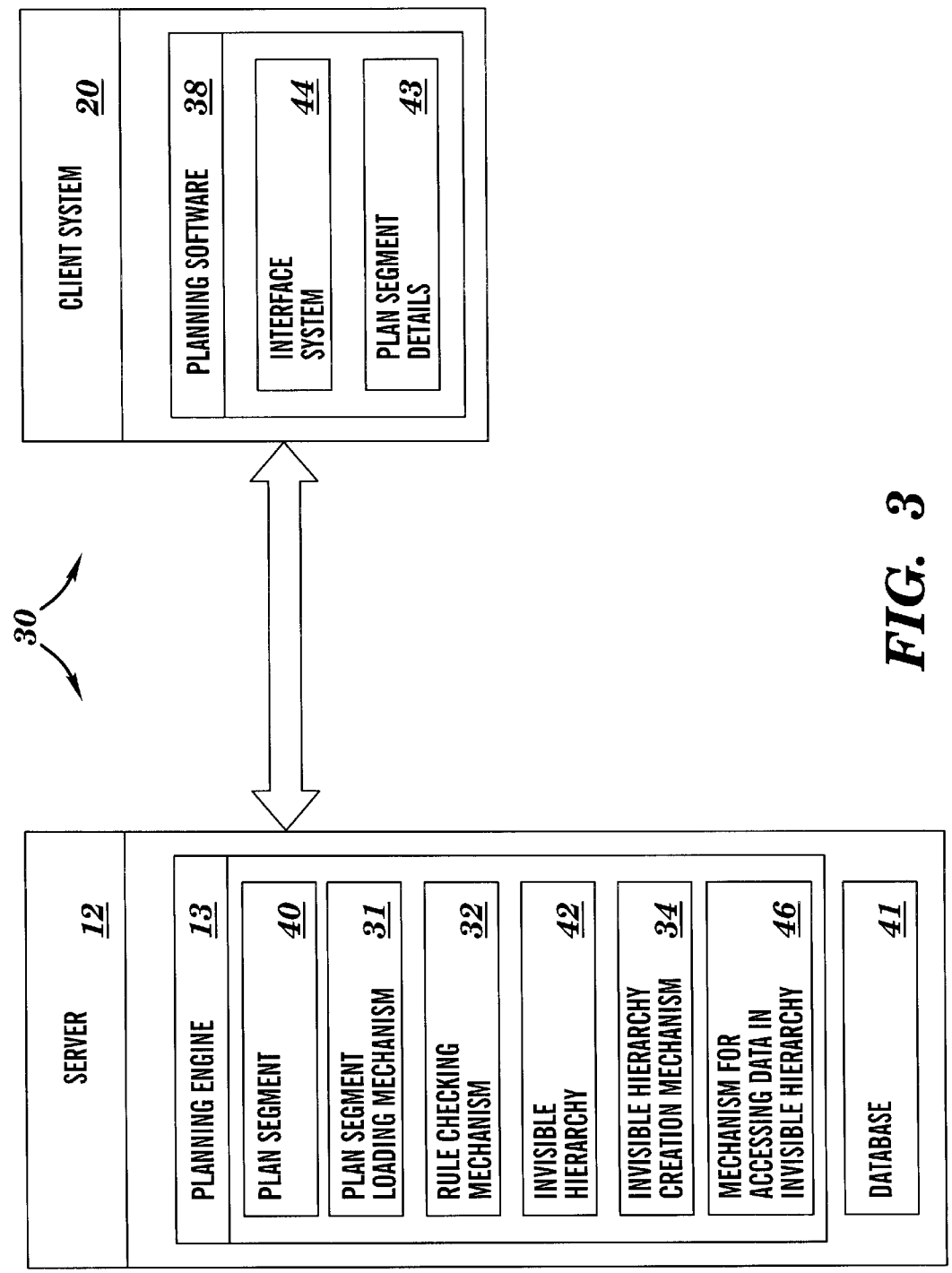
FIG. 3 depicts a client-server computer system and program in accordance with a preferred embodiment of the invention.

Referring now to FIG. 3, a planning system 30 depicting an embodiment of the present invention is shown. Client system 20 and server 12 each may comprise components (not shown) known in the art for implementing a client-server system, e.g., memory, processing units (e.g., CPU's), input output, a bus, etc. Memory for storing data and software in planning system 30 may comprise any known type of data storage and/or transmission media, including magnetic media, optical media, random access memory (RAM), read-only memory (ROM), a data object, etc. Moreover, memory may reside at a single physical location, comprising one or more types of data storage, or be distributed across a plurality of physical systems in various forms. Processing capabilities may likewise comprise a single processing unit, or a plurality of processing units distributed across one or more locations, e.g., on a client and server. I/O may comprise any known type of input output device, including, a network system, modem, keyboard, mouse, voice, CRT, printer, disk drives, etc. Additional components, such as cache memory, communication systems, etc., may also be incorporated into planning system 30.

It is understood that the present invention can be realized in hardware, software, or a combination of hardware and software. A planning system according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program, software program, or planning software, in the present context mean any expression, in any language, code or notation, of a set of instructions intended to cause a system having an information processing capability to perform a particular function either directly or after either or both of the following: (a) conversion to another language, code or notation; (b) reproduction in a different material form.

Planning is generally done at client system 20 using planning software 38, which resides on either or both of the client system 20 and server 12. On the client system 20, planning software 38 comprises various mechanisms for displaying and manipulating planning data, such as those found in IBM's MAKORO™ merchandise planning software. For example, planning software 38 may comprise an interface system 44 for displaying planning data in a spreadsheet format. Planning software 38 may further comprise plan segment details 43 associated with a plan segment 40 stored on server 12. Plan segment details typically contain only details (e.g., names) of data and hierarchies, while server 12 handles the storage of data related to the hierarchies. It is understood that while planning software 38 is typically stored and executed on client system 20, it may be stored and executed anywhere within planning system 30.

As noted above, the present invention recognizes that planners typically load and plan against only a subset of the plan (i.e., plan segment 40) instead of planning against the entire cube. This allows companies to provide an organized approach to planning, and ensures, for example, that a department-level planner is not altering store-wide or company-wide data. Thus, downloaded plan segments are generally limited by permissions set to meet the planning needs of a particular planner. Accordingly, in the past, if a planner was planning on a department level for mens' clothing, the planner could not access and/or manipulate higher level data (e.g., store-wide or company-wide data). Higher-level data is related to lower-level data in parent-child or ancestor member relationships, described in more detail in FIGS. 4 and 5. However, rules utilized to calculate variables and facts at the intersection of dimensions in a plan segment 40 may reference higher-level data outside the plan segment 40. In the past, these references would normally be deemed invalid for the planner even though the data may exist in database tables accessible by the server 12.

This invention allows planners to have access to such data without having to load the entire hierarchy and planning cube. Rather, data for ancestor members of the plan segment 40 in a hierarchy in a dimension is identified and separately loaded for read-only purposes. Thus, planners can circumvent permissions and access higher level plan data for variable calculations in the event a rule within plan segment 40 references such data.

Planning system 30 comprises various mechanisms for implementing the present invention. Although the mechanisms are described as residing on particular systems, it is understood that they can be stored and/or executed anywhere within planning system 30. Server 12 comprises a planning engine 13 and a database 41. Planning engine 13 comprises plan segment 40, plan segment loading mechanism 31, rule checking mechanism 32, invisible hierarchy 42, invisible hierarchy creation mechanism 34, and a mechanism for accessing data in the invisible hierarchy 46.

Plan segment 40 generally contains rules for calculating variables, and one or more defined hierarchies within a dimension. Plan segment 40 may provide access to various types of data in one or more hierarchies necessary for a planner to plan for future requirements. For example, plan segment 40 may be associated with a first hierarchy for planning based on seasonal information, and a second hierarchy for planning based on demographic information. Planning software 38 allows the planner to switch between the two hierarchies as needed. Each hierarchy is defined by metadata rules in a metadata table, which is stored in database 41 associated with plan segment 40.

Plan segment 40 is loaded onto server 12 for client 20 via plan segment loading mechanism 31. A rule checking mechanism 32 is provided to automatically check the rules associated with plan segment 40 and determine if any of the rules reference data from outside plan segment 40. Rule checking may be done at any time, but is preferably done during the loading of plan data. Rule checking may be done in any fashion. For example, a system administrator could set a flag in all rules that reference data from outside a plan segment. Rule checking mechanism 32 would then examine each rule to see if the flag was set. Alternatively, a software program could be utilized to examine each rule and automatically determine if a rule will reference outside data.

An invisible hierarchy creation mechanism 34 is provided to create an invisible hierarchy 42. Invisible hierarchy 42 is created by first identifying the ancestors of the top member of the hierarchy (or hierarchies) in the dimension within plan segment 40. A new hierarchy is then built consisting of: (1) the identified ancestors, and (2) the loaded members of the already loaded hierarchy (or hierarchies) found in plan segment 40. Once built, the invisible hierarchy 42 coexists in the same dimension as the already loaded hierarchy (or hierarchies). Data associated with the invisible members of invisible hierarchy 42 is loaded from database tables from the planning cube and is kept separate from the data associated with plan segment 40 in database 41. This effectively amounts to creating a dynamic hierarchy and loading a "slice" separate from plan segment 40.

A mechanism 46 for accessing data in the invisible hierarchy allows the planner to obtain data within the invisible hierarchy when needed. Mechanism 46 prohibits the planner from switching to the invisible hierarchy, but allows the data associated with the invisible hierarchy to be accessed by specific rule calculations. Accordingly, invisible hierarchy data, and all other processing done on plan segment 40, are kept hidden from the planner.

Figure 4:
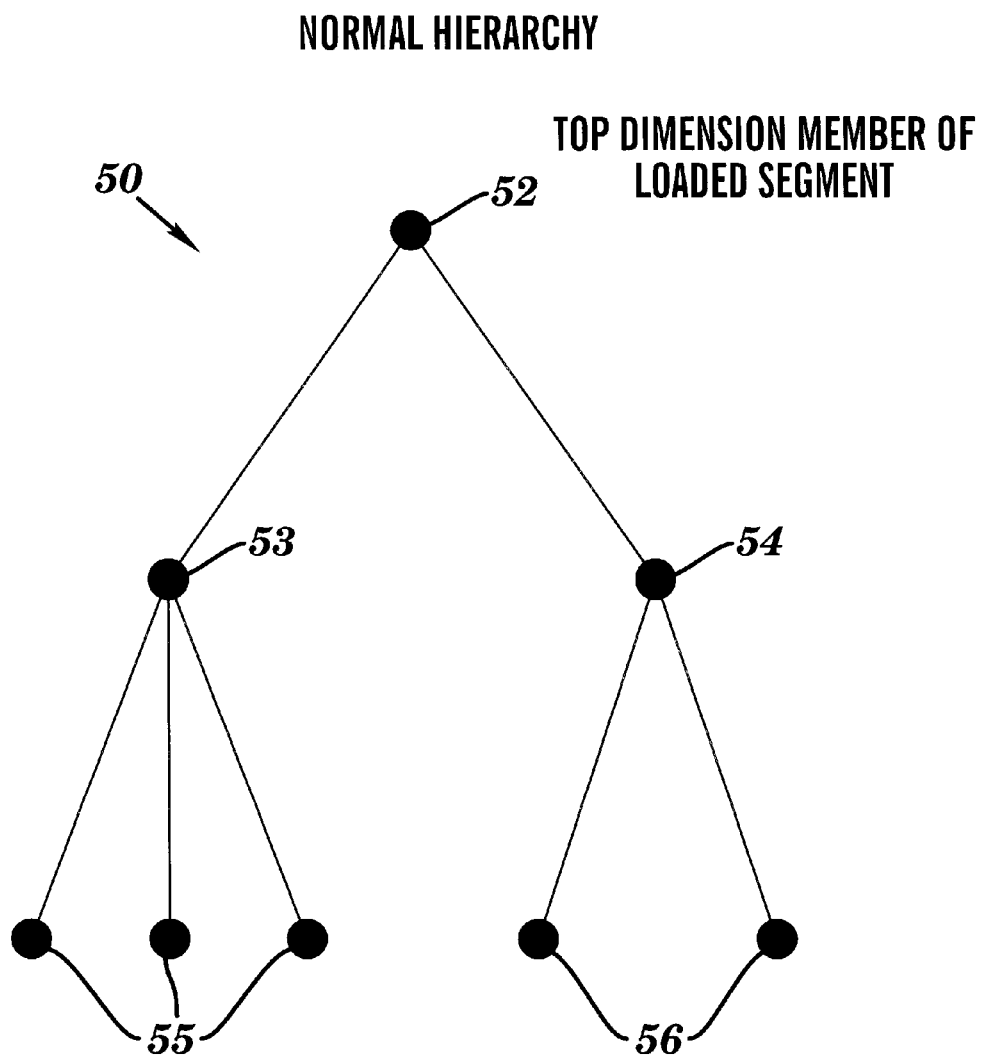
FIG. 4 depicts a normal hierarchy in accordance with a preferred embodiment of the present invention.

Referring now to FIG. 4, a "normal" hierarchy 50 associated with plan segment 40 is shown. Hierarchy 50 includes a plurality of members 52–56 arranged in a hierarchical fashion. For instance, data that is associated with members 56 is related to data associated with member 54 in a parent-child manner. Moreover, hierarchy 50 includes a top dimension member 52, which is an ancestor of all lower-level members. The relationships between members are stored in metadata tables in database 41.

Figure 5:
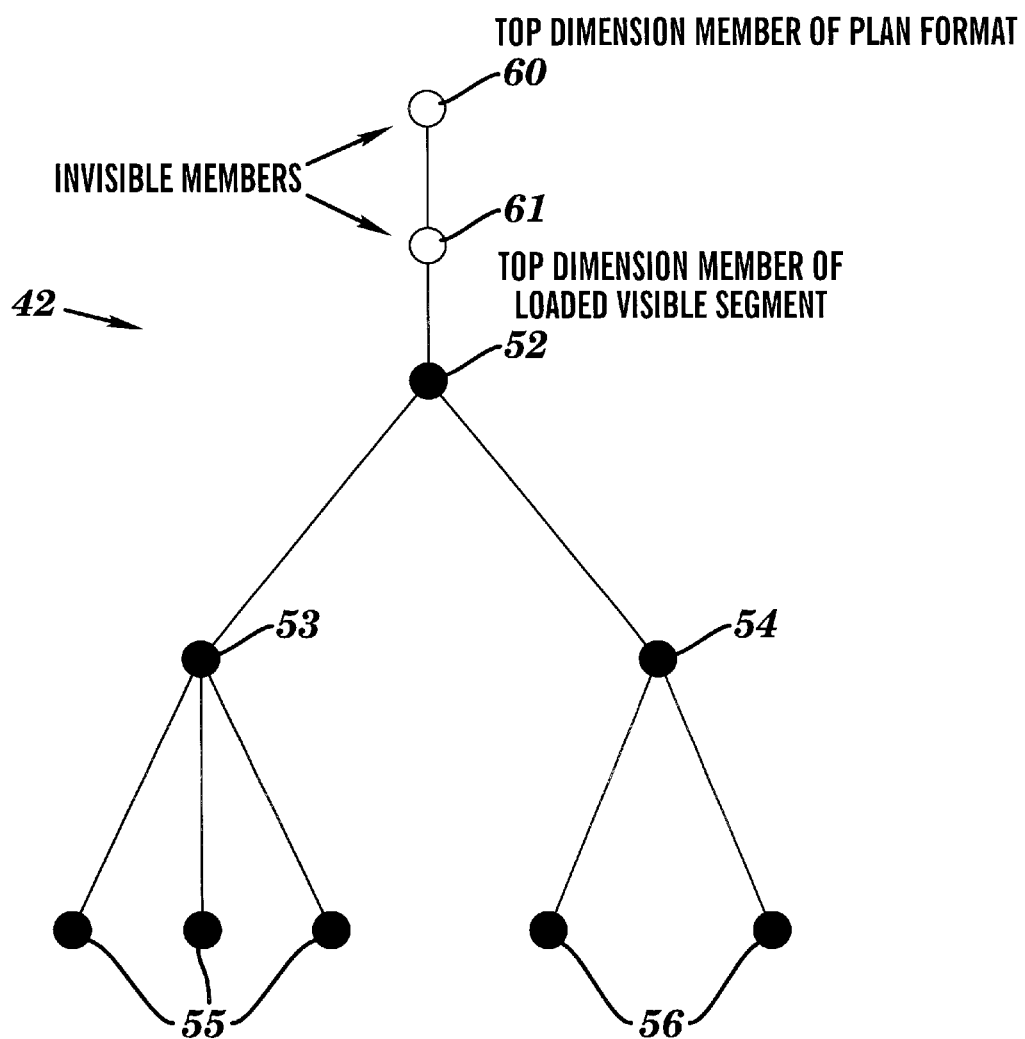
FIG. 5 depicts an invisible hierarchy in accordance with a preferred embodiment of the present invention.
Figure 6:
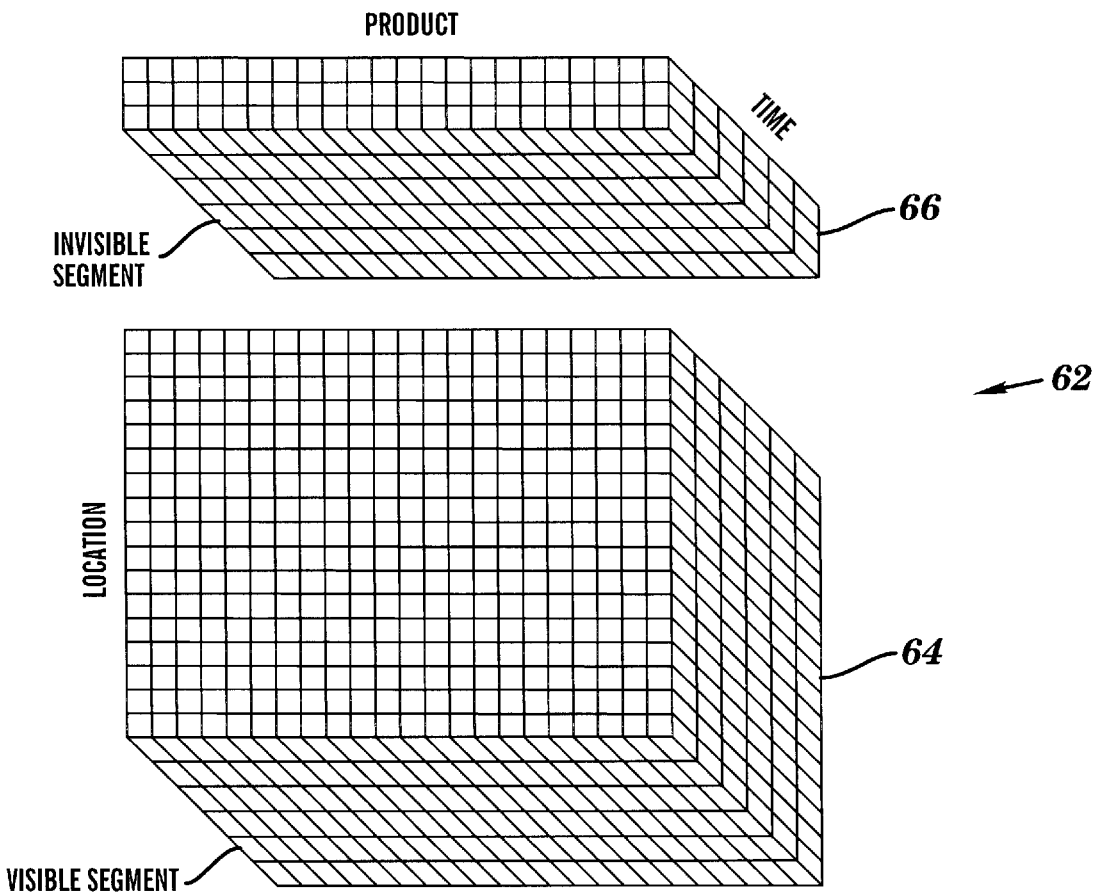
FIG. 6 depicts an expanded plan cube in accordance with a preferred embodiment of the present invention.

FIG. 5 depicts invisible hierarchy 42, which comprises the normal hierarchy 50 (see FIG. 4) and invisible members 60 and 61. In accordance with the method of creating invisible hierarchy 42, all ancestor members of top dimension member 52 are identified. In this case, two such ancestors were identified, members 60 and 61. Member 60 is the top dimension member of the plan format, and member 61 is the child of member 60. Once the invisible hierarchy 42 is created, it will only be used when a rule references ancestor data associated with invisible members 60 and 61. Thus, plan segment 40 does not include any metadata definitions for the invisible hierarchy. FIG. 6 depicts the resulting planning cube 62, which comprises a visible segment 64 and an invisible segment 66. The invention essentially expands a planner's cube by allowing variables in the visible segment 64 to access data associated with variables in the invisible segment 66.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

We claim:

1. A program product having computer readable code stored on a recordable media for creating an invisible hierarchy within a planning system, the program product comprising:
    a loading mechanism for loading a plan segment, wherein the plan segment is a portion of a plan cube and comprises data, rules, and a defined hierarchy within a dimension;
    a checking mechanism for determining whether any of the rules associated with the plan segment reference data outside of the plan segment; and
    a mechanism for creating an invisible hierarchy, wherein the invisible hierarchy comprises the defined hierarchy and at least one ancestor of a top member of the defined hierarchy.

2. The program product of claim 1, wherein the checking mechanism checks each rule for a preset flag in order to determine if the rule references data from outside of the plan segment.

3. The program product of claim 1, wherein the mechanism for creating an invisible hierarchy identifies ancestor members of the top member of the defined hierarchy by examining a metadata table in a database associated with the plan cube.

4. The program product of claim 1, further comprising an interface system for displaying data associated with the plan segment.

5. The program product of claim 1, further comprising a mechanism for accessing data associated with the at least one ancestor in the invisible hierarchy.

6. The program product of claim 5, wherein the data associated with the at least one ancestor in the invisible hierarchy is accessed in a read-only mode.

7. The program product of claim 5, wherein the data associated with the at least one ancestor in the invisible hierarchy is stored separately from the data associated with the plan segment.

8. A planning system, comprising:
    a processor; and
    memory for storing machine readable instructions that are executable by the processor, and for storing data;
    a server system, wherein the server system includes:
        a loading mechanism for loading a plan segment, wherein the plan segment is a portion of a plan cube and comprises data, rules, and a defined hierarchy within a dimension;
        a checking mechanism for determining whether any of the rules associated with the plan segment reference data outside of the plan segment; and
        a mechanism for creating an invisible hierarchy, wherein the invisible hierarchy comprises the defined hierarchy and at least one ancestor of a top member of the defined hierarchy; and
    a client system, wherein the client system includes:
        an interface system for displaying and manipulating data associated with the plan segment; and
        a mechanism for displaying data associated with the invisible hierarchy.

9. The planning system of claim 8, wherein the checking mechanism checks each rule for a preset flag in order to determine if the rule references data from outside of the plan segment.

10. The planning system of claim 8, wherein the mechanism for creating an invisible hierarchy identifies ancestor members of the top member of the defined hierarchy by examining a metadata table in a database associated with the plan cube.

11. The planning system of claim 8, wherein the data associated with the at least one ancestor in the invisible hierarchy is accessed in a read-only mode.

12. The planning system of claim 8, wherein the data associated with the at least one ancestor in the invisible hierarchy is stored separately from the data associated with the plan segment.

13. A method for dynamically creating an invisible hierarchy in a planning tool during a planning session, comprising the steps of:
    loading a segment of a planning cube, wherein the segment comprises data, rules, and a predefined hierarchy;
    examining the rules to determine if data from outside the segment is referenced by the rules;
    identifying ancestor members of a top member of the predefined hierarchy;
    loading ancestor member details and ancestor data for the identified ancestor members; and
    creating an invisible hierarchy comprised of the predefined hierarchy and the identified ancestor members.

14. The method of claim 13, wherein the examining step includes examining checking each rule for a pre-set flag that dictates whether data from outside the segment is referenced.

15. The method of claim 13, comprising the further step of maintaining the ancestor data separately from the loaded segment.

16. The method of claim 13, comprising the further step of providing an interface to view the ancestor data in a read-only mode when one of the rules references data outside of the segment.

* * * * *